US012784607B2

(12) United States Patent
Guttman et al.

(10) Patent No.: US 12,784,607 B2
(45) **Date of Patent: *Nov. 3, 2026**

(54) CLASS-WIDE COMPREHENSION MODELING AND AI-SOURCED TEACHER CONTENT RECOMMENDATIONS

(71) Applicant: HonorEd Technologies, Inc., San Francisco, CA (US)

(72) Inventors: Stephan Peter Guttman, Santa Clara, CA (US); Joel Marc Podolny, San Francisco, CA (US); Gregory N. Christie, San Jose, CA (US); Pooja Brown, San Francisco, CA (US)

(73) Assignee: HonorEd Technologies, Inc., San Francisco, CA (US)

(*) Notice: Subject to any disclaimer, the term of this patent is extended or adjusted under 35 U.S.C. 154(b) by 628 days.

This patent is subject to a terminal disclaimer.

(21) Appl. No.: 18/339,976

(22) Filed: Jun. 22, 2023

(65) Prior Publication Data

US 2023/0419848 A1 Dec. 28, 2023

Related U.S. Application Data

(60) Provisional application No. 63/356,301, filed on Jun. 28, 2022.

(51) Int. Cl.

| | |
|---|---|
| ***G09B 5/14*** | (2006.01) |
| ***G09B 5/12*** | (2006.01) |
| ***H04L 67/50*** | (2022.01) |

(52) U.S. Cl.

CPC ................. *G09B 5/14* (2013.01); *G09B 5/12* (2013.01); *H04L 67/535* (2022.05)

(58) Field of Classification Search

CPC ............ G09B 5/14; G09B 5/12; H04L 67/535

See application file for complete search history.

(56) References Cited

U.S. PATENT DOCUMENTS 8,882,509 B1 * 11/2014 Nunamaker ........... G09B 19/18 434/107

11,087,634 B2 * 8/2021 Chambers ................ G09B 5/02

(Continued)

FOREIGN PATENT DOCUMENTS

| | | |
|---|---|---|
| CN | 108182489 B | 6/2021 |
| CN | 111626372 A | 6/2023 |

OTHER PUBLICATIONS

PCT International Search Report and Written Opinion, PCT Application No. PCT/US2023/026029, Oct. 18, 2023, 12 pages.

(Continued)

*Primary Examiner* — Malina D. Blaise

(74) *Attorney, Agent, or Firm* — FENWICK & WEST LLP

(57) ABSTRACT

A system generates a training dataset based on historical consumption information and historical comprehension information of historical users, and uses the training dataset to train a machine-learned model to predict a measure of comprehension for a user consuming educational content. The system applies the machine-learned model to behaviors of a target user to determine a target measure of comprehension for target educational content, identifies one or more characteristics of the target educational content, applies a content identification model to identify supplemental educational content, and generates an educational content interface to present the supplemental educational content to the target user. In some examples, the system trains the machine-learned model to predict a collective measure of comprehension for a set of users consuming educational content, identifies a set of supplemental educational content, and generates a teacher interface to present the set of supplemental educational content.

20 Claims, 13 Drawing Sheets

(56) References Cited

U.S. PATENT DOCUMENTS

| | | | | |
|---|---|---|---|---|
| 12,243,177 | B1 * | 3/2025 | Fieldman | G06T 13/40 |
| 2005/0038711 | A1 * | 2/2005 | Marlelo | G06Q 30/02 705/27.1 |
| 2006/0282356 | A1 * | 12/2006 | Andres | G06Q 40/00 705/37 |
| 2012/0196261 | A1 * | 8/2012 | Kim | G09B 5/062 434/322 |
| 2012/0231437 | A1 * | 9/2012 | Fakhrai | G09B 7/00 434/350 |
| 2012/0231438 | A1 * | 9/2012 | Fakhrai | G09B 7/00 434/350 |
| 2013/0004935 | A1 * | 1/2013 | Smith | G09B 5/06 434/365 |
| 2013/0095465 | A1 * | 4/2013 | Menon | G09B 7/02 434/362 |
| 2013/0137078 | A1 * | 5/2013 | Shustorovich | G09B 7/00 434/362 |
| 2013/0236877 | A1 * | 9/2013 | Zhou | G06Q 30/02 434/350 |
| 2014/0227673 | A1 * | 8/2014 | Yousef | G09B 5/00 434/350 |
| 2016/0275804 | A1 * | 9/2016 | Koppel | G09B 5/12 |
| 2017/0236434 | A1 * | 8/2017 | Mehta | G09B 5/08 434/350 |
| 2018/0005539 | A1 * | 1/2018 | Chatow | G06F 16/94 |
| 2018/0330628 | A1 * | 11/2018 | Ahn | G09B 7/02 |
| 2019/0171284 | A1 * | 6/2019 | Contractor | G09B 5/02 |
| 2019/0251477 | A1 * | 8/2019 | Crosta | G06Q 50/20 |
| 2019/0385470 | A1 * | 12/2019 | Le Chevalier | G06F 16/9535 |
| 2020/0051460 | A1 * | 2/2020 | Bedor | G09B 19/22 |
| 2020/0242956 | A1 * | 7/2020 | Gihm | G06Q 50/20 |
| 2020/0287984 | A1 * | 9/2020 | Walsh | G06F 11/2023 |
| 2022/0027799 | A1 * | 1/2022 | Momo | G06F 18/2415 |
| 2022/0343793 | A1 * | 10/2022 | Roberts | G09B 5/06 |
| 2023/0215283 | A1 * | 7/2023 | Sha | G09B 7/04 434/365 |
| 2023/0215288 | A1 * | 7/2023 | Sha | G06F 3/011 |

OTHER PUBLICATIONS

United States Office Action, U.S. Appl. No. 18/339,979, Apr. 10, 2026, 14 pages.

* cited by examiner

300

350

400

400

400

600

CLASS-WIDE COMPREHENSION MODELING AND AI-SOURCED TEACHER CONTENT RECOMMENDATIONS

CROSS-REFERENCE TO RELATED APPLICATIONS

This application claims a benefit of U.S. Provisional Application No. 63/356,301, filed Jun. 28, 2022, all of which is incorporated by reference herein in their entirety.

TECHNICAL FIELD

The present disclosure generally relates to content recommendation and, particularly, comprehension modeling and AI-sourced content recommendations.

BACKGROUND

Online learning has become increasingly prevalent. Specifically, online education platforms offer numerous advantages, such as accessibility, flexibility, and a wide range of courses. However, such platforms also come with certain problems, for instance because they often lack the same level of personal interaction found in traditional classrooms. The absence of face-to-face interaction can make it difficult for students to engage with instructors and fellow students, ask questions, and receive immediate feedback. This can result in a sense of isolation and reduced motivation to participate actively in the learning process.

Figure 1:
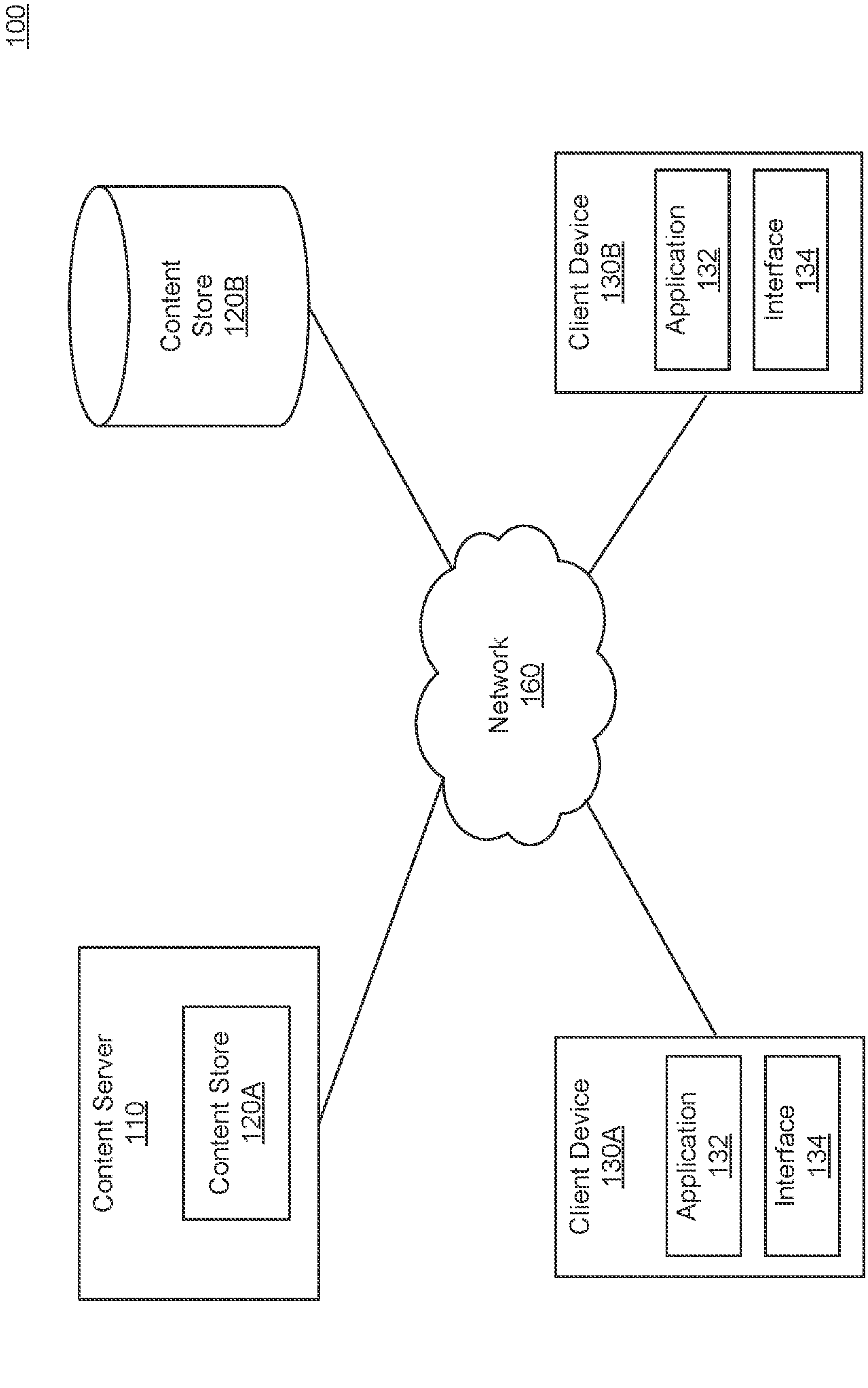
FIG. 1 is a block diagram illustrating an example education system environment, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed are systems (as well as methods and computer program code stored on non-transitory computer readable mediums) configured to provide a system that accesses historical consumption information and historical comprehension information of a set of historical users. The system generates a training dataset based on the accessed historical consumption information and the historical comprehension information and uses the training dataset to train a machine-learned model to predict a measure of comprehension for a user consuming educational content. The system applies the machine-learned model to behaviors of a target user to determine a target measure of comprehension for each of a plurality of portions of target educational content. The system identifies one or more characteristics of a portion of the target educational content, applies a content identification model to the identified characteristics of the portion of the target educational content to identify supplemental educational content, and generates an educational content interface to present the supplemental educational content to the target user.

In some embodiments, the system accesses historical consumption information and historical comprehension information of a set of historical users. The system generates a training dataset based on the accessed historical consumption information and historical comprehension information and uses the training dataset to train a machine-learned model to predict a collective measure of comprehension for a set of users consuming educational content. The system applies the machine-learned model to behaviors of a set of target users to determine a collective target measure of comprehension for each of a plurality of portions of the target educational content. The system identifies one or more characteristics of the portion of the target educational content, applies a content identification model to the identified characteristics to identify a set of supplemental educational content, and generates a teacher interface to present the set of supplemental educational content.

The disclosed configurations beneficially provide a system (and/or a method) for asynchronous and synchronous teaching and learning which provides users with an interactive and enriched learning experience. The system allows a teaching user (e.g., teach, professor, educator, faculty, etc.) from different institutions and disciplines to use their course materials to develop and deliver engaging and scalable courses to those attending online, in-person or in a hybrid situation. A teaching user may use the system to develop courses that involve organizing, manipulating and sequencing educational content and interactive widgets into study materials, such as pre-work material, live sessions, follow-on assignments, etc. The student users may organize, augment, and create their own student notes/feedbacks with similar interface elements. The student users may share their notes with other students (e.g., in a study group) or share their notes with the teaching user (e.g., as an assignment). The feedbacks and reactions can form loops. As such, the users can constantly engage and interact with each other with respect to the course content, either synchronously or asynchronously.

Example System Configuration

FIG. 1 is a block diagram that illustrates an education system environment 100, in accordance with an embodiment. The education system environment 100 includes a content server 110, one or more content stores 120A, 120B, one or more client devices 130A, 130B, and a network 160. The entities and components in the education system environment 100 communicate with each other through a network 160. In various embodiments, the education system environment 100 includes fewer or additional components. In some embodiments, the education system environment 100 also includes different components. While some of the components in the education system environment 100 is described in a singular form, the education system environment 100 may include one or more of each of the components. Different client devices 130 may also access the content server 110 simultaneously. The client device 130 and the content server 110 may include some or all of the components of a computing device such as one described with FIG. 7 and an appropriate operating system.

In an example embodiment, the content server 110 may be a computing system that provides educational content to users. The content server 110 may use a comprehension model to determine a measure of comprehension for a user consuming educational content. In some embodiments, the content server 110 may apply the comprehension model to behaviors of a target user to determine a target measure of comprehension for target educational content. In response to the target measure of comprehension being below a threshold, the content server 110 may use a content identification model to identify supplemental education content to improve the user's comprehension on the target educational content. In some embodiments, the content server 110 may use a comprehension model to determine a collective measure of comprehension for a set of users consuming educational content and identify a set of supplement educational content for the set of users to improve a collective measure of comprehension on the target educational content. In some embodiments, the content server 110 may generate a user interface to present the supplemental educational content to the users. In some embodiments, the content server 110 may collect data related content consumption behaviors and measures of comprehension and present learning analytics based on the collected data in a user interface for the user to review.

The content store 120 stores various files and data of the content server 110. In some embodiments, the content store 120A is provided by content server 110. In some the content store 120B is external to the content server 110 and includes one or more computing devices that include memory or other storage media for storing various files and data. The data stored in the content store 120 includes a variety of educational content. Educational content may refer to any content that is used to engage, inspire and inform users to learn, for example, teacher lectures, seminar presentation, peer student's notes, steaming videos, etc. The educational content may include a variety of formats, such as, text, PDF, E-book (ePub format), video clip, streaming video, audio clip, streaming audio, image(s), rich text format (RTF) content, PowerPoint/Keynote, Word doc/Pages doc, Google docs, web site, data source/data feed, HTML, 3D object, downloadable files, etc.

A user may enter user input via a client device 130. Client devices 130 can be any personal or mobile computing devices such as smartphones, tablets, notebook computers, laptops, desktop computers, and smartwatches as well as any home entertainment device such as televisions, video game consoles, television boxes, and receivers. The client device 130 can present information received from the content server 110 to a user, for example in the form of user interfaces. In some embodiments, the client device may be a student device 130A, operated by a student user; alternatively, the client device may be a teacher device 130B, operated by a teaching user. In some embodiments, the content server 110 may be stored and executed from the same machine as the client device 130.

A client device 130 includes one or more applications 142 and interfaces 144 that may display visual elements of the applications 142. The client device 130 may be any computing device. Examples of such client devices 130 include personal computers (PC), desktop computers, laptop computers, tablets (e.g., iPADs), smartphones, wearable electronic devices such as smartwatches, or any other suitable electronic devices.

The application 132 is a software application that operates at the client device 130. In one embodiment, an application 132 is published by the party that operates the content server 110 to allow clients to communicate with the content server 110. In various embodiments, an application 132 may be of different types. In one embodiment, an application 132 is a web application that runs on JavaScript and other backend algorithms. In the case of a web application, the application 132 cooperates with a web browser to render a front-end interface 134. In another embodiment, an application 132 is a mobile application. In yet another embodiment, an application 132 may be a software program that operates on a desktop computer that runs on an operating system such as LINUX, MICROSOFT WINDOWS, MAC OS, or CHROME OS.

An interface 134 is any suitable interface for a client to interact with the content server 110. The client may communicate to the application 132 and the content server 110 through the interface 134. The interface 134 may take different forms. In one embodiment, the interface 144 may be a web browser such as CHROME, FIREFOX, SAFARI, INTERNET EXPLORER, EDGE, etc. and the application 132 may be a web application that is run by the web browser. In one embodiment, the interface 134 is part of the application 132. For example, the interface 134 may be the front-end component of a mobile application or a desktop application. In one embodiment, the interface 134 also is a graphical user interface which includes graphical elements and user-friendly control elements. In one embodiment, the interface 134 may display a graphical user interface that provides learning analytics of educational consumption behaviors. The interface 134 may further include one or more user interactive elements so that a user may with the interface 134. In some embodiments, the interface 134 presents supplemental educational content to a user. In some embodiments, the interface 134 presents a set of supplemental educational content to a teaching user for selection and presents the selected supplemental educational content to student users for review. Examples of the interface 144 are discussed in further detail below with reference to FIG. 4A to FIG. 6D.

The network 160 provides connections to the components of the system environment 100 through one or more sub-networks, which may include any combination of local area and/or wide area networks, using both wired and/or wireless communication systems. In one embodiment, a network 160 uses standard communications technologies and/or protocols. For example, a network 160 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 160 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 160 may be represented using any suitable format, such as hypertext markup language (HTML), extensible markup language (XML), JavaScript object notation (JSON), structured query language (SQL). In some embodiments, some of the communication links of a network 160 may be encrypted using any suitable technique or techniques such as secure sockets layer (SSL), transport layer security (TLS), virtual private networks (VPNs), Internet Protocol security (IPsec), etc. The network 160 also includes links and packet switching networks such as the Internet. In some embodiments, a data store belongs to part of the internal computing system of a server (e.g., the data store 120 may be part of the content server 110). In such cases, the network 160 may be a local network that enables the server to communicate with the rest of the components.

Example Content Server Components

Figure 2:
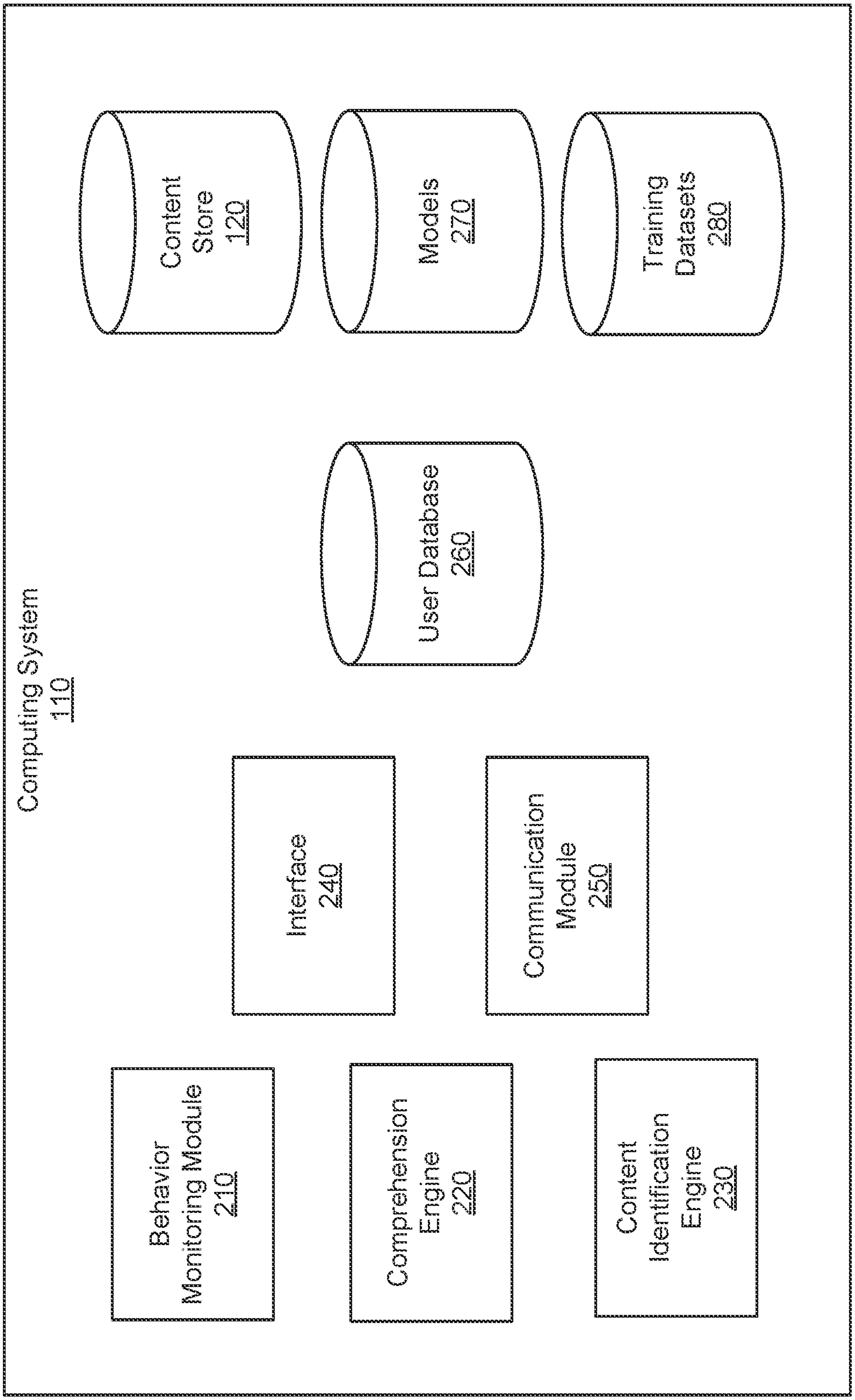
FIG. 2 is a block diagram illustrating components of a content server, in accordance with an embodiment.

FIG. 2 is a block diagram illustrating components of a content server 110, in accordance with an embodiment. The content server 110 includes a behavior monitoring module 210, a comprehension engine 220, a content identification engine 230, an interface 240, a communication module 250, a user database 260, model(s) 270, training dataset(s) 280, and a content store 120. In various embodiments, the content server 110 may include fewer or additional components. The content server 110 also may include different components. The functions of various components may be distributed in a different manner than described below. Moreover, while each of the components in FIG. 2 may be described in a singular form, the components may present in plurality. The components may take the form of a combination of software and hardware, such as software (e.g., program code comprised of instructions) that is stored on memory and executable by a processing system (e.g., one or more processors).

The behavior monitoring module 210 collects data associated with a user's educational content consumption behaviors, e.g., user behaviors related to the user's consumption of educational content. In some embodiments, the educational content consumption behaviors may include parameters such as, reading rates, pause time, number of re-read times, delays in content consumption, highlighting, types of highlighting, highlight coverage, time of day, switch outs, switch duration, and/or similar parameters that describe a user's action/performance during the consumption of educational content. For example, a user may tag a portion of educational content with "unclear," "important," "interesting," and/or "debatable." The behavior monitoring module 210 is capable of receiving communications from the client device 130 about a user's actions on and/or off the education system environment 100. In some embodiments, the behavior monitoring module 210 may record the educational content consumption behaviors in real time as the user consumes the content; alternatively, the user's educational content consumption behaviors may be monitored periodically. For example, the behavior monitoring module 210 may record the reading time after a user completes reading of a whole chapter. In another example, the behavior monitoring module 210 may collect the reading rate per page, or record an average reading rate for a whole chapter. In some embodiments, the behavior monitoring module 210 may aggregate the monitored user's behavior and present it to the user for review. Further detail is discussed below with reference to FIG. 5. The behavior monitoring module 210 stores the collected educational content consumption behaviors in the user database 260. In some embodiments, the collected educational content consumption behaviors may be stored in the training datasets 280 for training the models 270.

In some embodiments, the behavior monitoring module 210 may obtain collective educational content consumption behaviors for a set of users. The set of users may consume the same educational content, for example, students registering the same class, audiences attending the same lecture, etc. In some instance, the set of users may be determined based on the educational content the users consume, time and/or location of the users consume the educational content, etc. The collective educational content may be stored in the user database 260, and/or used as the training datasets 280 for training the models 270.

The comprehension engine 220 determines a measure of comprehension for a user consuming educational content. The measure of comprehension describes a level of comprehension when a user consumes educational content. In some embodiments, the educational content may include one or more portions, and the comprehension engine 220 may determine the measure of comprehension for each of the one or more portions. In one embodiment, the comprehension engine 220 may determines the measure of comprehension in real time as the user consumes the content; in another embodiment, the measure of comprehension may be determined periodically. For example, the comprehension engine 220 may determine the measure of comprehension after a user consumes one page of educational content; alternatively, the comprehension engine 220 may determine an average measure of comprehension after the user finishes a whole chapter.

The comprehension engine 220 may determine a measure of comprehension based on behaviors of the user as the user consumes the educational content. For example, for a user consumes a portion of educational content, more switch out times may relate to a lower concentration than less switch out times. In some embodiments, the comprehension engine 220 may compare the behaviors of user to statistical behaviors of historical users to determine the measure of comprehension. For example, for a portion of educational content, an average duration time of consumption, e.g., determined based on historical user behaviors, may be about 10 minutes. If a user takes more than 30 minutes or less than 1 minute to complete the portion of educational content, the comprehension engine may determine the user's comprehension is low.

In some embodiments, the comprehension engine 220 applies one or more models 270 to determine a measure of comprehension for a user. The models 270 may predict a measure of comprehension for a user based on the analysis performed on historical data. In one implementation, the comprehension engine 220 applies a machine-learned comprehension model to behaviors of a user consuming educational content to determine a measure of comprehension for the user. The comprehension model may be trained with training datasets 280, which includes historical consumption information and historical comprehension information of a set of historical users. In some embodiments, the historical consumption information may include information that describes historical educational content consumption behaviors of the set of the historical users. The historical comprehension information may include historical measures of comprehension of historical educational content for the set of historical users. In some embodiments, the measure of comprehension of educational content may include one or more of test scores, user evaluations of comprehension, types of highlighting, post-comprehension quiz results. For example, a historical measure of comprehension may be related to a student's performance on pop quizzes after consuming the educational content, and/or a student's highlight as "unclear/confusing."

In some embodiments, the comprehension engine 220 determines a collective measure of comprehension for a set of users consuming educational content. The collective measure of comprehension describes a level of comprehension for the set of users who consumes educational content. In some embodiments, the educational content may include one or more portions, and the comprehension engine 220 may determine a collective measure of comprehension for each of the one or more portions of the educational content. In some embodiments, the comprehension engine 220 may apply a machine-learned comprehension model to behaviors of the set of users, for example, collective educational content consumption behaviors, to predict the collective measure of comprehension for the corresponding educational content.

The content identification engine 230 may identify one or more characteristics of the target educational content. The characteristics of the educational content may refer to the content, perspectives, formats, lengths, publication time, authors, etc. For example, lecture slides on "Introduction to Biology" can be supplemented with a video "Introduction to Biology" which is about the same content but in different formats. In another example, a supplemental educational content for a textbook on "Data analysis" from Author A be a series of online animations showing processes of data analysis. These characteristics of educational content may be stored in the content stores 120.

The content identification engine 230 identifies supplemental educational content based on identified characteristics of the target educational content. The supplemental educational content may be educational content that have similar characteristics to the target educational content and can be used to supplement the target educational content to improve the user's comprehension. In one implementation, the content identification engine 230 may access content that are stored in the content store 120. The content identification engine 230 may identify a set of candidate content from the stored content and determine one or more of the set of candidate content as the supplemental content for the target educational content. In some embodiments, the supplemental educational content and the target educational content were consumed by the same historical users, and the content identification engine 230 may determine the supplemental educational content based on user feedbacks. In some other embodiments, the content identification engine 230 may determine the supplemental educational content based on historical user data, such as educational content consumption behaviors and/or measures of comprehension of educational content. In still other embodiments, the content identification engine 230 may determine the supplemental educational content based on statistical data of a set of users.

In one instance, the content identification engine 230 applies one or more models 270 to identify the supplemental educational content related to the target educational content. In some embodiments, the models 270 may include a machine-learned content identification model. The content identification model may be trained with a training dataset 280 which includes historical educational content consumed by historical users, and the historical educational content includes one or more target educational content and supplemental educational content associated with each target educational content consumed by the historical users. In one implementation, the content identification model is configured to predict a likelihood that the supplemental educational content will improve a user's measure of comprehension for the target educational content. In another implementation, the content identification model may be configured to predict a relatedness measure that describes the relatedness between the supplemental educational content and the target educational content.

The content identification engine 230 receives the output of the content identification model and identifies the supplemental content based on the output. For example, for a content identification model that predicts likelihood of improvement on the user's measure of comprehension, the content identification engine 230 may rank the likelihood for each of the candidate content and select the candidate content with the highest likelihood as the supplemental content for the target educational content. Alternatively, the content identification engine 230 may determine a threshold of the likelihood, and select one or more candidate content of which likelihoods are higher than the threshold, as the supplemental educational content. Similarly, for a content identification model that predict a relatedness measure, the content identification engine 230 may select the supplemental content based on the ranking of the relatedness measure or using a threshold relatedness measure to select one or more candidate content as the supplemental educational content.

In some embodiments, the content identification engine 230 may identify personalized supplemental educational content for a user. For example, the content identification model may be trained with a training dataset 280 that includes historical educational content consumption behaviors and corresponding historical measures of comprehension of educational content for the user. In this way, the content identification model may predict a supplemental educational content that suits the specific user, e.g., most likely to improve the user's measure of comprehension. For example, a user who is more efficient with listening to lectures, the content identification engine 230 may identify an audio record as a supplemental educational content to improve the user's measure of comprehension.

In some embodiments, the content identification engine 230 determines a set of supplemental educational content for a set of users consuming the target educational content. In one instance, the content identification model may be trained with a training dataset 280 that includes collective educational content consumption behaviors and corresponding collective measures of comprehension of educational content for the set of users. In one example, the content identification model may predict a set of supplemental educational content that suit for the set of users, e.g., most likely to improve the collective measure of comprehension for the set of users. For example, the content identification engine 230 may identify a set of supplement educational content for a class of students who consume the same educational content, e.g., attending the same class.

In some embodiments, the target educational content may include one or more portions, and the content identification engine 230 may identify supplemental educational content related to each portion of the target educational content. In some embodiments, one or more portions of the target educational content are related to a low-comprehension dedicated section, and the content identification engine 230 may identify supplemental educational content for the low-comprehension dedicated section.

In some embodiments, the content identification engine 230 may identify the supplemental educational content in real time as the user consumes the content, e.g., at the end of each page of the target educational content. The content identification engine 230 may continuously update the supplemental educational content in real time. Alternatively, the content identification engine 230 may identify supplemental educational content after the user finishes the consumption of the whole target educational content, e.g., at the end of the lecture, at the end of a chapter, etc.

The interface 240 includes interfaces that are used to communicate with the client devices 130. The interface 240 is in communication with the application 142 of a client device 130 and provides data to render the application 142. In one embodiment, the interface 240 provides a client device 130 in the form of a graphical user interface (GUI) for users to display educational content consumption behaviors and supplemental educational content. For example, the interface 240 may provide actionable learning analytics based on the educational content consumption behaviors to the users. In some embodiments, the interface 240 may generate an educational content interface to present the supplemental educational content to a target student user. In some embodiments, the interface 240 may generate an educational content interface (e.g., teacher interface) to present a set of supplemental educational content to a target teaching user. The target teaching user may select one or more of the set of supplemental educational content via the educational content interface. The interface 240 may generate a student interface to present the selected supplemental educational content to a set of target student users.

The interface 240 may receives user interactions/requests to modify the educational content interface displayed on the client device. For example, the interface 240 may generate a student interface to present the selected portions of the supplemental educational content to each of the set of the target users. In another example, the interface 240 may present the selected portions of the supplemental educational content to one or more of the set of the target users, e.g., users with a below-threshold measure of comprehension, users who prefer certain types of educational content, etc. In yet another example, the interface 240 may present the selected portion of the supplemental educational content in a subsequent education session, for example, in a subsequent lesson/course, in a test/quiz, etc. In some embodiments, the configuration of the interfaces presented to the user may be customized by the user, and/or pre-determined by a teaching user. Examples of the interface 144 are discussed in further detail below with reference to FIG. 4A to FIG. 6D.

The communication module 250 transmits communication information between the client devices 130. For example, the communication module 250 receives a question from a first client device 130 on a portion of the educational content and sends the question to a second client device 130. The first client device 130 may be a student device that is operated by a student user, and the second client device 130 may be a teacher device that is operated by a teaching user. The teacher device may send an answer to the question to the student device via the communication module 250. In some embodiments, the communication module 250 may transmit questions, notifications, messages, feedbacks, comments, and the like among one or more client devices 130. In some embodiments, the communication module 250 may provide an interactive interface through which the users may message with each other and receive notifications regarding the communication information related to the educational content.

The models 270 includes various models accessed by the comprehension engine 220 and the content identification engine 230. In some embodiments, the models 270 may include a comprehension model that is assessable by the comprehension engine 220 to predict a measure of comprehension for a user. In some embodiments, the comprehension model may predict a collective measure of comprehension for a set of users consuming educational content. In one implementation, the models 270 may include a content identification model that is accessible by the content identification engine 230 to predict supplemental educational content related to target educational content for a specific user. In another implementation, the content identification model may predict a set of supplemental educational content for a set of users consuming the target educational content.

In some embodiments, the comprehension model and/or the content identification model may be a machine-learned model. For example, the comprehension model may include a multi-feature linear regression model. In one implementation, the comprehension model may be trained using supervised model that uses data describing the educational content consumption behaviors and a historical user's comprehension of the educational content. In some embodiments, a machine-learned model is associated with an objective function, which generates a metric value that describes the objective goal of the training process. For example, the training intends to reduce the error rate of the model in generating predictions of the corresponding information in an upcoming time period. In such a case, the objective function may monitor the error rate of the machine-learned model. In some embodiments, the machine-learned model includes certain layers, nodes, kernels, and/or coefficients. Training of the machine-learned model includes iterations of forward propagation and backpropagation. Each layer in a neural network may include one or more nodes, which may be fully or partially connected to other nodes in adjacent layers. In forward propagation, the neural network performs the computation in the forward direction based on outputs of a preceding layer. The operation of a node may be defined by one or more functions. The functions that define the operation of a node may include various computation operations such as convolution of data with one or more kernels, pooling, recurrent loop in RNN, various gates in LSTM, etc. The functions may also include an activation function that adjusts the weight of the output of the node. Nodes in different layers may be associated with different functions.

In some embodiments, the models 270 may be trained using datasets stored in the training datasets 280, and/or external data provided by a third-party data source. In some embodiments, the training datasets 280 may store historical consumption information and historical comprehension information of historical users, and/or external data provided by a third-party data source. In some embodiments, the training datasets 280 may be updated periodically, continuously, and/or in real time. For example, a student's learning and comprehension may improve overtime, new students may add to a class, some students may drop a class, etc. To maintain and improve the accuracy of the models 270, the training datasets 280 may be updated with the user's new information. For example, the newly collected educational content consumption behaviors and measure of comprehension may be added to the training datasets 280. The models 270 may be retrained or fine-tuned with the updated training datasets 280. In one example, the models 280 is retrained using the combined dataset of the original training data and the new data. In another example, the models 280 may be updated incrementally using the new data while leveraging the existing knowledge captured by the previous models. In some embodiments, the models 270 may be continuously updated in real time as the user consumes the educational content; alternatively; the models 270 may be updated periodically, such as, per day, per month, per semester, and/or after the consumption of each lecture, each chapter, etc.

Content Recommendation Process

Figure 3A:
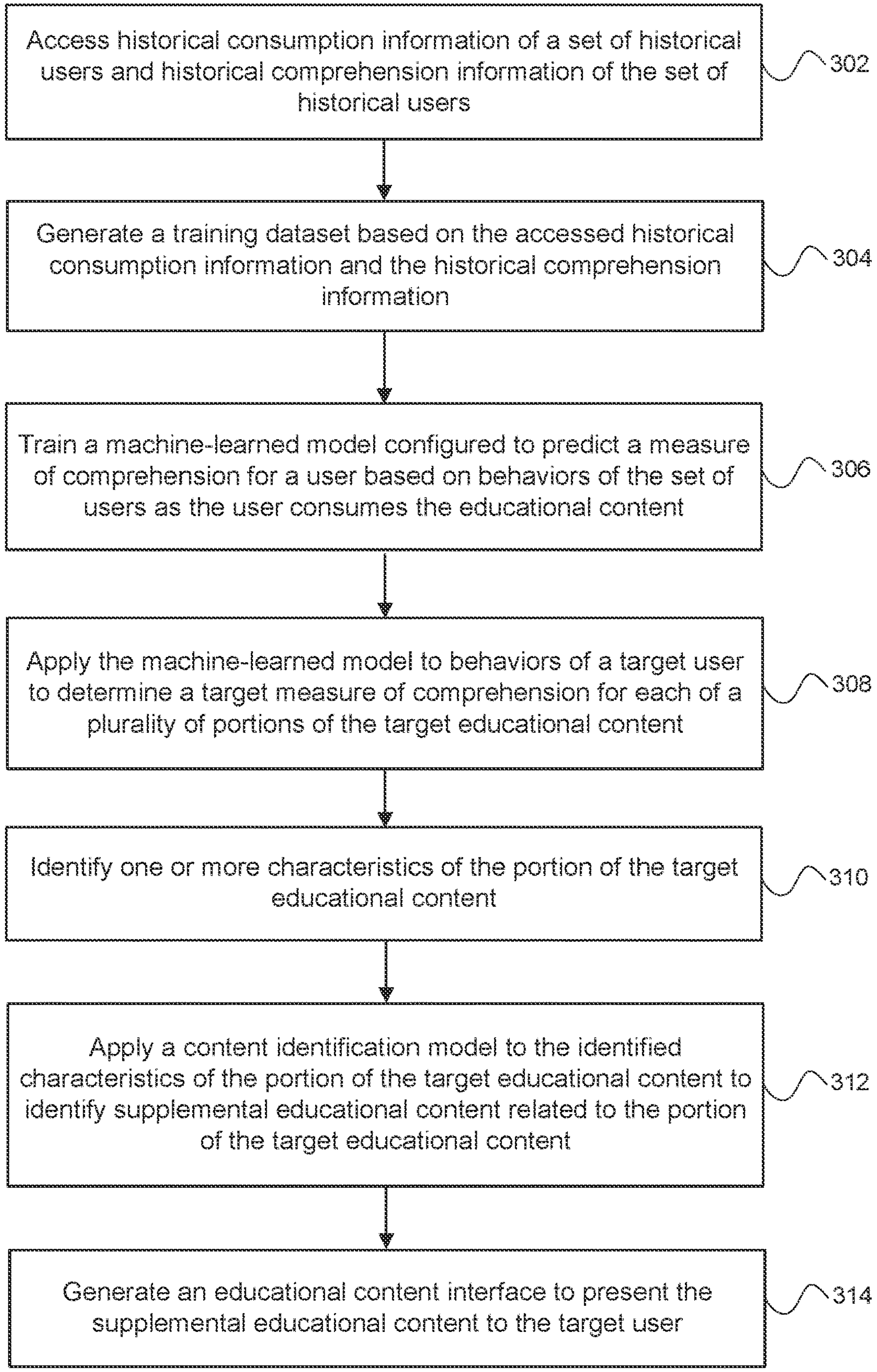
FIG. 3A is a flowchart depicting a computer-implemented process for providing content recommendations, in accordance with an embodiment.

FIG. 3A is a flowchart depicting a computer-implemented process 300 for providing content recommendations, in accordance with an embodiment. A computer associated with the content server 110 includes a first processor and first memory. The first memory stores a set of code instructions that, when executed by the first processor, causes the first processor to perform some of the steps described in the process 300. Other entities may perform some or all of the steps in FIG. 3A. The content server 110 as well as the other entities may include some or of the component of the machine (e.g., computer system) described in conjunction with FIG. 7. Embodiments may include different and/or additional steps, or perform the steps in different orders.

The content server 110 accesses 302 historical consumption information of a set of historical users and historical comprehension information of the set of historical users. The historical consumption information may describe historical educational content consumption behaviors of the set of historical users. The historical comprehension information may include a historical measure of comprehension of historical educational content by the set of historical users. In some embodiments, the educational content consumption behaviors include one or more of reading rates, pause time, number of re-read times, delays in content consumption, highlighting, types of highlighting, highlight coverage, time of day, switch outs, and switch duration. In some embodiments, the measure of comprehension may include one or more of test scores, user evaluations of comprehension, types of highlighting, post-comprehension quiz results. The historical consumption information and historical comprehension information of the set of historical users may be stored user database 260. In some embodiments, the content server 110 may collect the consumption information and historical comprehension information of the set of historical users; alternatively, the content server 110 may access the consumption information and historical comprehension information that are provided by a third party.

The content server 110 generates 304 a training dataset based on the accessed historical consumption information and the historical comprehension information. In some embodiments, the historical consumption information and historical comprehension information of the set of historical users may be stored in the training datasets 280 for training the models 270.

The content server 110 trains 306 a machine-learned model. The machine-learned model may be a comprehension model that predicts a measure of comprehension for a user who consumes educational content. The measure of comprehension describes a level of comprehension when a user consumes educational content. The content server 110 may determine the measure of comprehension based on behaviors of the user as the user consumes the educational content.

The content server 110 applies 308 the machine-learned model to behaviors of a target user who consumes target educational content to determine a target measure of comprehension for each of a plurality of portions of the target educational content. In some embodiments, the educational content may include one or more portions, and the content server 110 may determine the target measure of comprehension for each of the one or more portions. In one embodiment, the content server 110 may determines the target measure of comprehension in real time as the user consumes the content; in another embodiment, the target measure of comprehension may be determined periodically. For example, the content server 110 may determine the target measure of comprehension after a user consumes one page of educational content; alternatively, the content server 110 may determine an average target measure of comprehension after the user finishes a whole chapter.

The content server 110 identifies 310 one or more characteristics of the portion of the target educational content. In some embodiments, the content server 110 may determine whether the target measure of comprehension for a portion of the target educational content is a below-threshold target measure of comprehension. If the determined target measure of comprehension is below a threshold, the content server 110 may identify the characteristics for the portion of the target educational content to recommend a supplemental educational content to the user to improve the user's comprehension associated with the portion of educational content. The characteristics of the educational content may refer to the content, perspectives, formats, lengths, publication time, authors, etc.

The content server 110 applies 312 a content identification model to the identified characteristics of the portion of the target educational content to identify supplemental educational content related to the portion of the target educational content. The content server 110 identifies supplemental educational content based on identified characteristics of portion of the target educational content.

The content identification model may be trained with a training dataset 280 which includes historical educational content consumed by historical users, and the historical educational content includes one or more target educational content and supplemental educational content associated with each portion of the target educational content consumed by the historical users. In one implementation, the content identification model is configured to predict a likelihood that the supplemental educational content will improve a user's measure of comprehension for the portion of the target educational content. In another implementation, the content identification model may be configured to predict a relatedness measure that describes the relatedness between the supplemental educational content and the portion of the target educational content.

The content server 110 may identify a set of candidate content based on the output of the content identification model. The content server 110 may rank the set of candidate content based on, e.g., the likelihood of improving the user's measure of comprehension, the relatedness between the portion of the target educational content and each of the set of candidate content. The content server 110 may select the candidate content with the highest ranking as the supplemental educational content or select a set of candidate content of which ranking is above a threshold as a set of supplemental educational content.

In some embodiments, the content server 110 may identify the supplemental educational content in real time as the user consumes the content, e.g., at the end of each page of the target educational content. The content server 110 may continuously update the supplemental educational content in real time. Alternatively, the content identification engine 230 may identify supplemental educational content after the user finishes the consumption of the whole target educational content, e.g., at the end of the lecture, at the end of a chapter, etc.

The content server 110 generates 314 an educational content interface to present the supplemental educational content to the target user. In some embodiments, the content server 110 may display the supplemental educational content to the target user in real time as the target user consumes the portion of the target educational content. Alternatively, the content server 110 may display the supplemental educational content to the target user after the target user consumes the portion of the target educational content. In some embodiments, more than one portion of the target educational content may be associated with a below-threshold target measure of comprehension, and these portions of the target educational content may be related to a low-comprehension dedicated section. The content server 110 may identify second supplemental educational content related to a second portion of the target educational content associated with a below-threshold target measure of comprehension. The content server 110 modifies the educational content interface to add the second supplemental educational content for display.

Figure 3B:
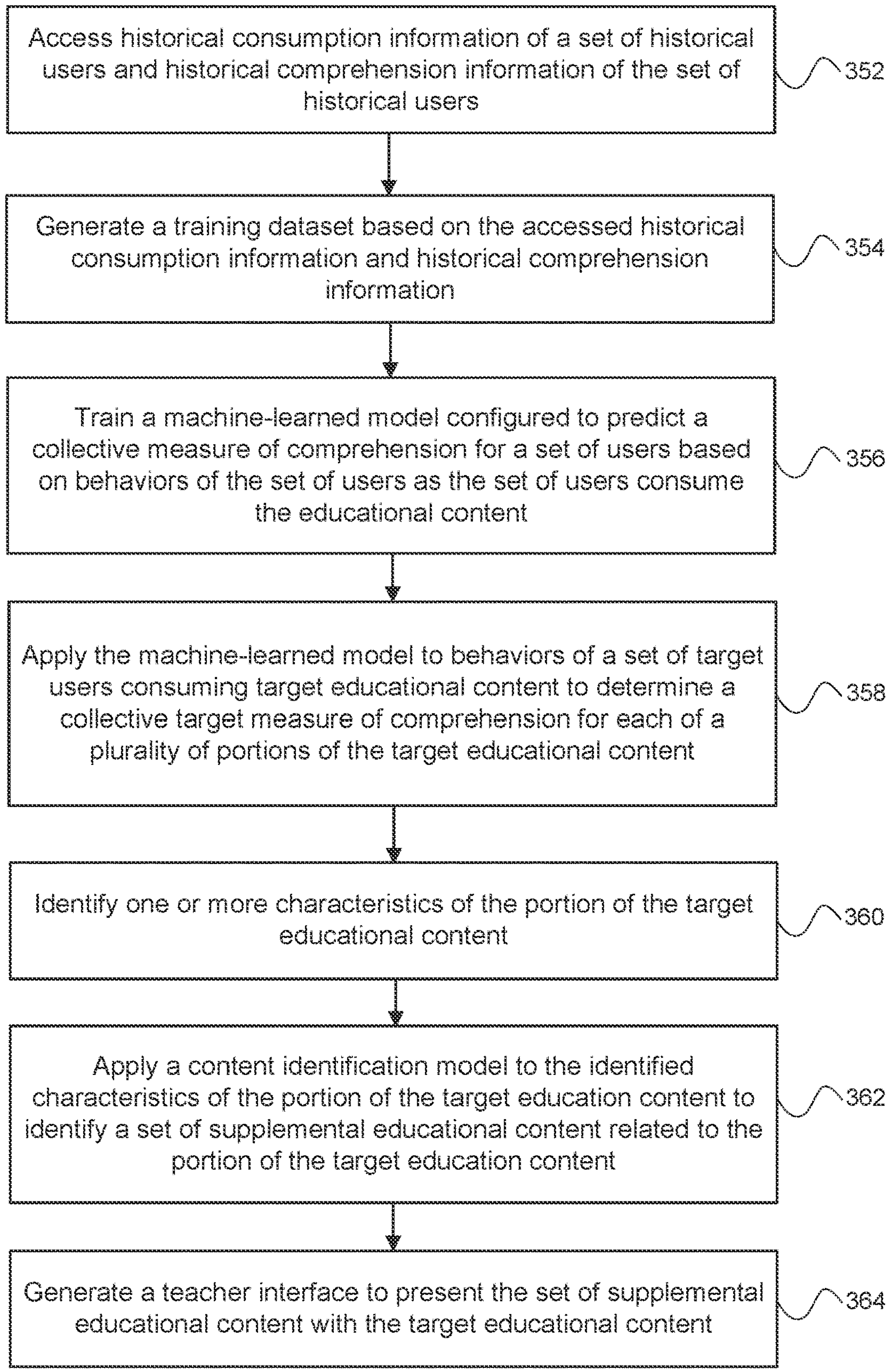
FIG. 3B is a flowchart depicting a computer-implemented process for providing content recommendations, in accordance with an embodiment.

FIG. 3B is a flowchart depicting a computer-implemented process 350 for providing content recommendations, in accordance with an embodiment. A computer associated with the content server 110 includes a first processor and first memory. The first memory stores a set of code instructions that, when executed by the first processor, causes the first processor to perform some of the steps described in the process 350. Other entities may perform some or all of the steps in FIG. 3B. The content server 110 as well as the other entities may include some or of the component of the machine (e.g., computer system) described in conjunction with FIG. 7. Embodiments may include different and/or additional steps, or perform the steps in different orders.

The content server 110 accesses 352 historical consumption information and historical comprehension information of a set of historical users. The historical consumption information may describe historical educational content consumption behaviors of the set of historical users. The historical comprehension information may include a historical measure of comprehension of historical educational content by the set of historical users. In some embodiments, the educational content consumption behaviors include one or more of reading rates, pause time, number of re-read times, delays in content consumption, highlighting, types of highlighting, highlight coverage, time of day, switch outs, and switch duration. In some embodiments, the measure of comprehension may include one or more of test scores, user evaluations of comprehension, types of highlighting, post-comprehension quiz results. The historical consumption information and historical comprehension information of the set of historical users may be stored user database 260. In some embodiments, the content server 110 may collect the consumption information and historical comprehension information of the set of historical users; alternatively, the content server 110 may access the consumption information and historical comprehension information that are provided by a third party.

The content server 110 generates 254 a training dataset based on the accessed historical consumption information and historical comprehension information. In some embodiments, the historical consumption information and historical comprehension information of the set of historical users may be stored in the training datasets 280 for training the models 270.

The content server 110 trains 256 a machine-learned model which includes a comprehension model configured to predict a collective measure of comprehension for a set of users consuming educational content. The collective measure of comprehension describes a level of collective comprehension for the set of users when the set of users consume educational content. The content server 110 may determine the measure of comprehension based on behaviors of the set of users as the users consume the educational content.

The content server 110 applies 258 the machine-learned model to behaviors of a set of target users consuming target educational content to determine a collective target measure of comprehension for each of a plurality of portions of the target educational content.

The content server 110 identifies 360 one or more characteristics of the portion of the target educational content. In some embodiments, the content server 110 may determine whether the collective measure of comprehension for a portion of the target educational content is a below-threshold collective target measure of comprehension. If the determined collective target measure of comprehension is below the threshold, the content server 110 may identify the characteristics for the portion of the target educational content to recommend a set of supplemental educational content to the set of target users to improve the collective comprehension associated with the portion of educational content.

The content server 110 applies 362 a content identification model to the identified characteristics of the portion of the target educational content to identify a set of supplemental educational content related to the portion of the target educational content. The content server 110 identifies the set of supplemental educational content based on identified characteristics of portion of the target educational content.

The content identification model may be trained with a training dataset 280 which includes historical educational content consumed by historical users, and the historical educational content includes one or more target educational content and supplemental educational content associated with each portion of the target educational content consumed by the historical users. In one implementation, the content identification model is configured to predict a likelihood that the supplemental educational content will improve a collective measure of comprehension for the portion of the target educational content. In another implementation, the content identification model may be configured to predict a relatedness measure that describes the relatedness between the supplemental educational content and the portion of the target educational content.

In some embodiments, the content server 110 may identify the set of supplemental educational content in real time as the set of users consume the content, e.g., at the end of each page of the target educational content. The content server 110 may continuously update the set of supplemental educational content in real time. Alternatively, the content identification engine 230 may identify the set of supplemental educational content after the user finishes the consumption of the whole target educational content, e.g., at the end of the lecture, at the end of a chapter, etc. In one implementation, the content server 110 may present the set of supplemental educational content in a subsequent education session, for example, in a subsequent lesson/course, in a test/quiz, etc.

The content server 110 generates 364 a teacher interface to present the set of supplemental educational content with the target educational content. In some embodiments, a teaching user may input a selection of one or more portions of the set of supplemental educational content via the teacher interface. The content server 110 receives the selection of one or more portions of supplemental educational content via the teacher interface and generates a student interface to present the selected one or more portions of supplemental educational content. In some embodiments, the content server 110 may present the selected one or more portions of supplemental educational content to each of the set of target users. Alternatively, the content server 110 may present the selected one or more portions of supplemental educational content to one or more target users, e.g., users with a below-threshold measure of comprehension, users who prefer certain types of educational content, etc.

Example User Interfaces

Figure 4A:
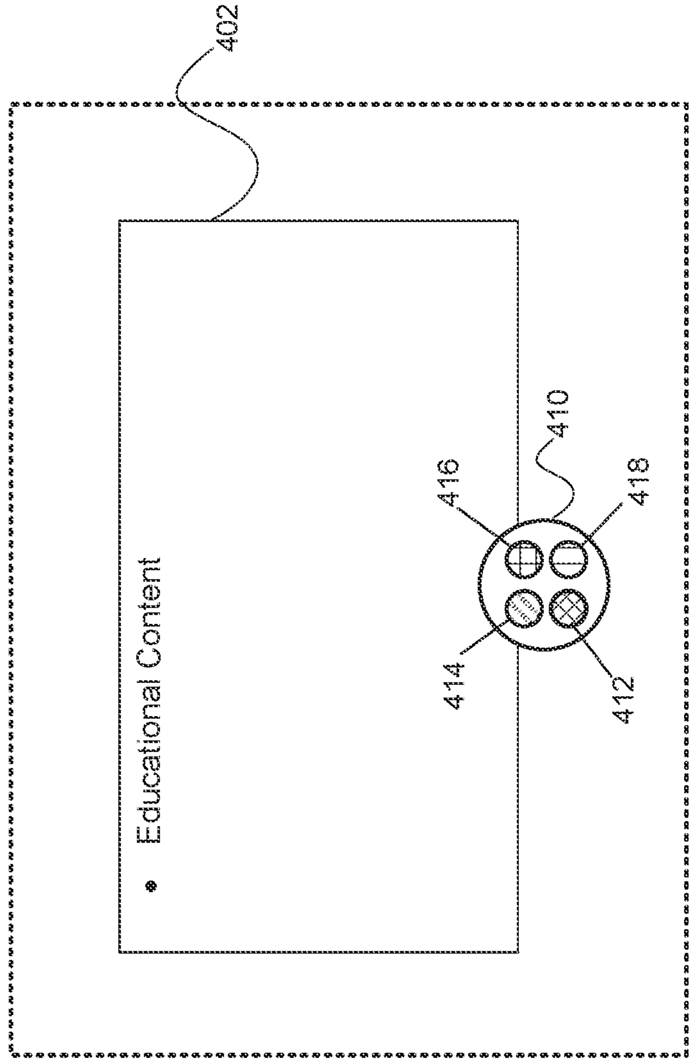
FIG. 4A illustrates an example user interface, in accordance with an embodiment.

FIG. 4A illustrates an example user interface 400, in accordance with an embodiment. The user interface 400 is a graphical user interface that may be provided by the interface 240 of the content server 110. The user interface 400 is displayed by the interface 134 of a client device 130. In some embodiments, the client device 130 may be a student device 130A, i.e., operated by a student user. In some embodiments, the user interface 400 may be displayed by a webpage browser, a mobile application, etc.

As shown in FIG. 4A, the user interface 400 includes educational content 402 and an interface element 410. The user interface 400 presents the educational content 402 for a user to consume. The interface element 410 includes a set of interactive elements, 412, 414, 416, and 418, which allow the user to interact with the user interface 400. The interface element 410 is associated with the educational content 402. Based on the user's interaction with the interactive elements, the user interface 400 may obtain educational content consumption behaviors of the user and/or the measure of comprehension of the educational content 402.

Figure 4B:
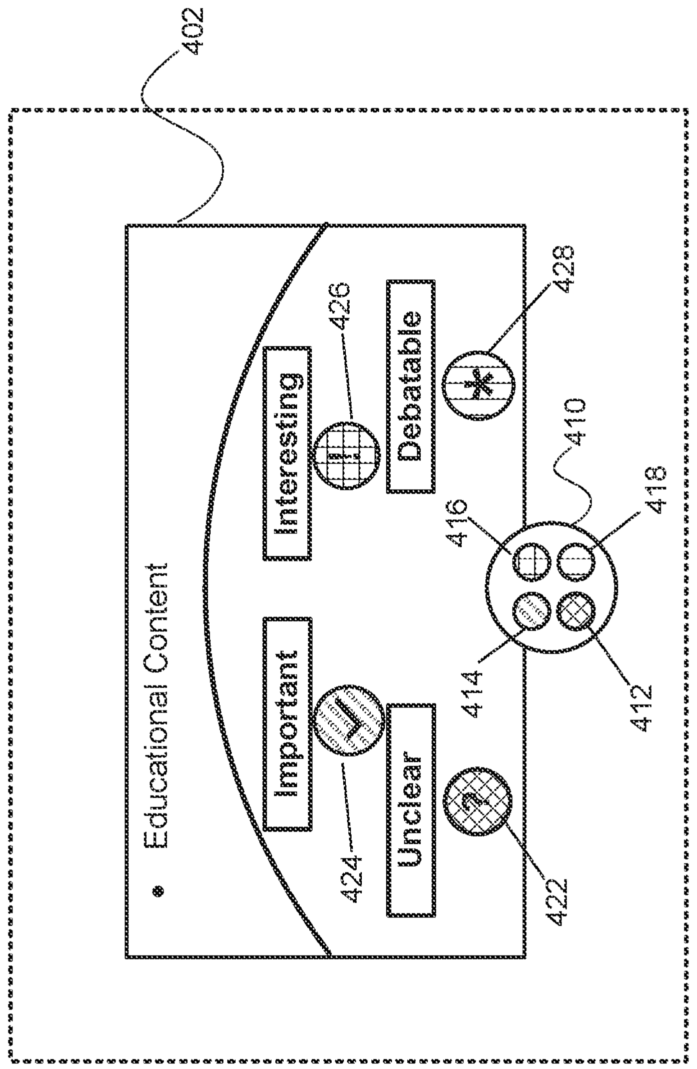
FIG. 4B illustrates another example user interface, in accordance with an embodiment.

Referring to FIG. 4B, which illustrates an example user interface 400, in accordance with an embodiment. Following the context of the example described in FIG. 4A, FIG. 4B shows the user interface 400 expands to provide a second set of interactive elements, such as 422, 424, 426, and 428. Each interactive element may be associated with a tag, for example, "unclear," "important," "interesting," and "debatable." By interacting with an interactive element, a user may add the corresponding tag to the educational content 402. The user interface 400 may expand to add the additional interactive elements in response to the user interacts (e.g., clicking, pressing, hovering, etc.) with an interactive element, e.g., 412, 414, 416, or 418. The two sets of interactive elements, e.g., 412-418 and 422-428, may be paired, e.g., the interactive element 412 is paired with the interactive element 422. In one example, a user clicks the interactive element 412 may result in adding a tag of "unclear" to the educational content 402.

Figure 4C:
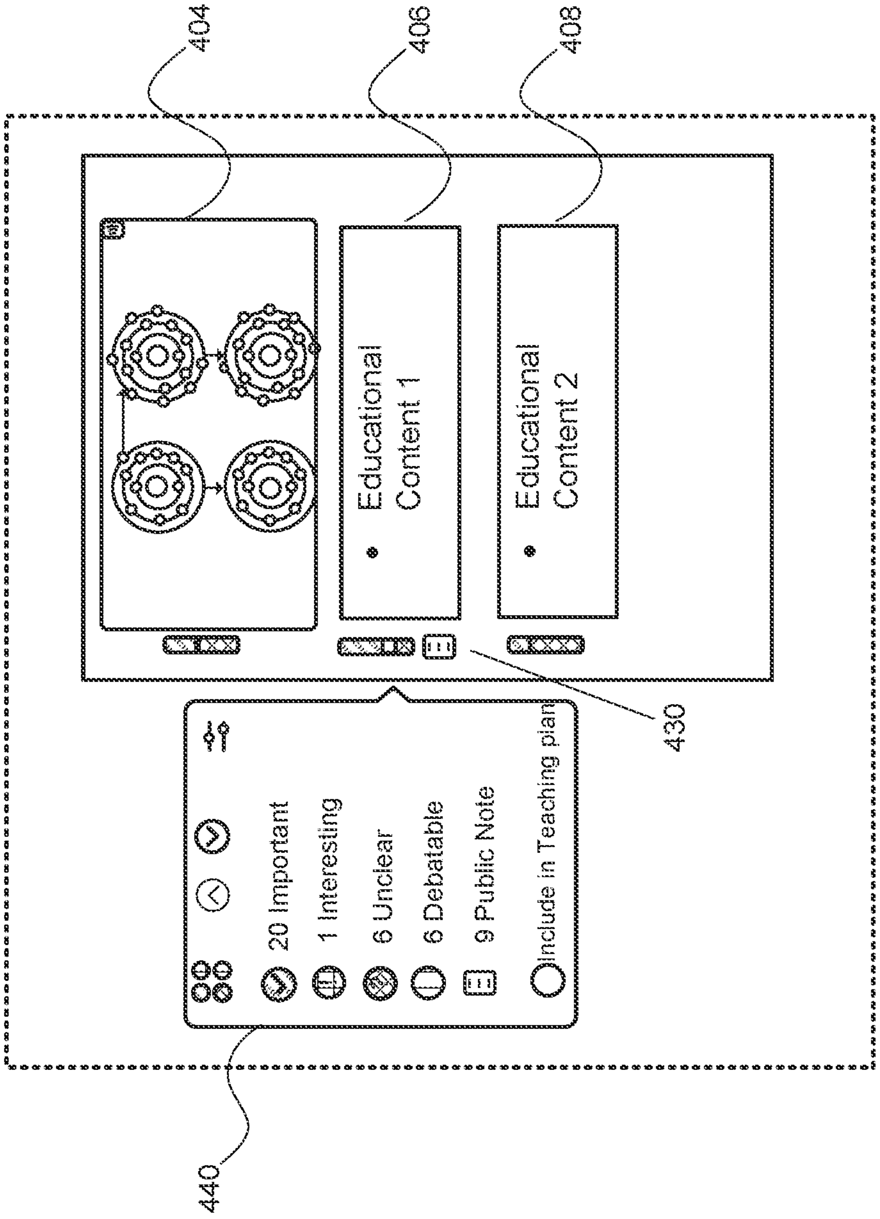
FIG. 4C illustrates another example user interface, in accordance with an embodiment.

FIG. 4C illustrates an example user interface 400, in accordance with an embodiment. Following the context of the example described in FIG. 4A and FIG. 4B, the user interface 400 presents learning analytics associated with the educational content. As shown in FIG. 4C, the educational content may include one or more portions, e.g., 404, 406, and 408. Based on the user interaction with the user interface 400 as discussed in FIG. 4A and FIG. 4B, each portion of the educational content may be associated with an interface element, e.g., 430, which indicates the learning analytics associated with the portion of educational content. When a user interacts with the interface element 430, the user interface 400 may provide a second interface element 440 which presents detailed learning analytics. In some embodiments, the learning analytics is associated with the educational content consumption behaviors and/or measures of comprehension for a set of users. As shown in FIG. 4C, the interface element 430 may indicate that for the portion of educational content 406, 20 users tagged it as "important," 1 user tagged it as "interesting," etc. In some embodiments, the interface element 430 may include users' comments, shown as "9 public note," which is viewable to all of the set of users. In some embodiments, the interface element 430 may include a teaching user's comment/feedback, such as "teaching plan."

Figure 5:
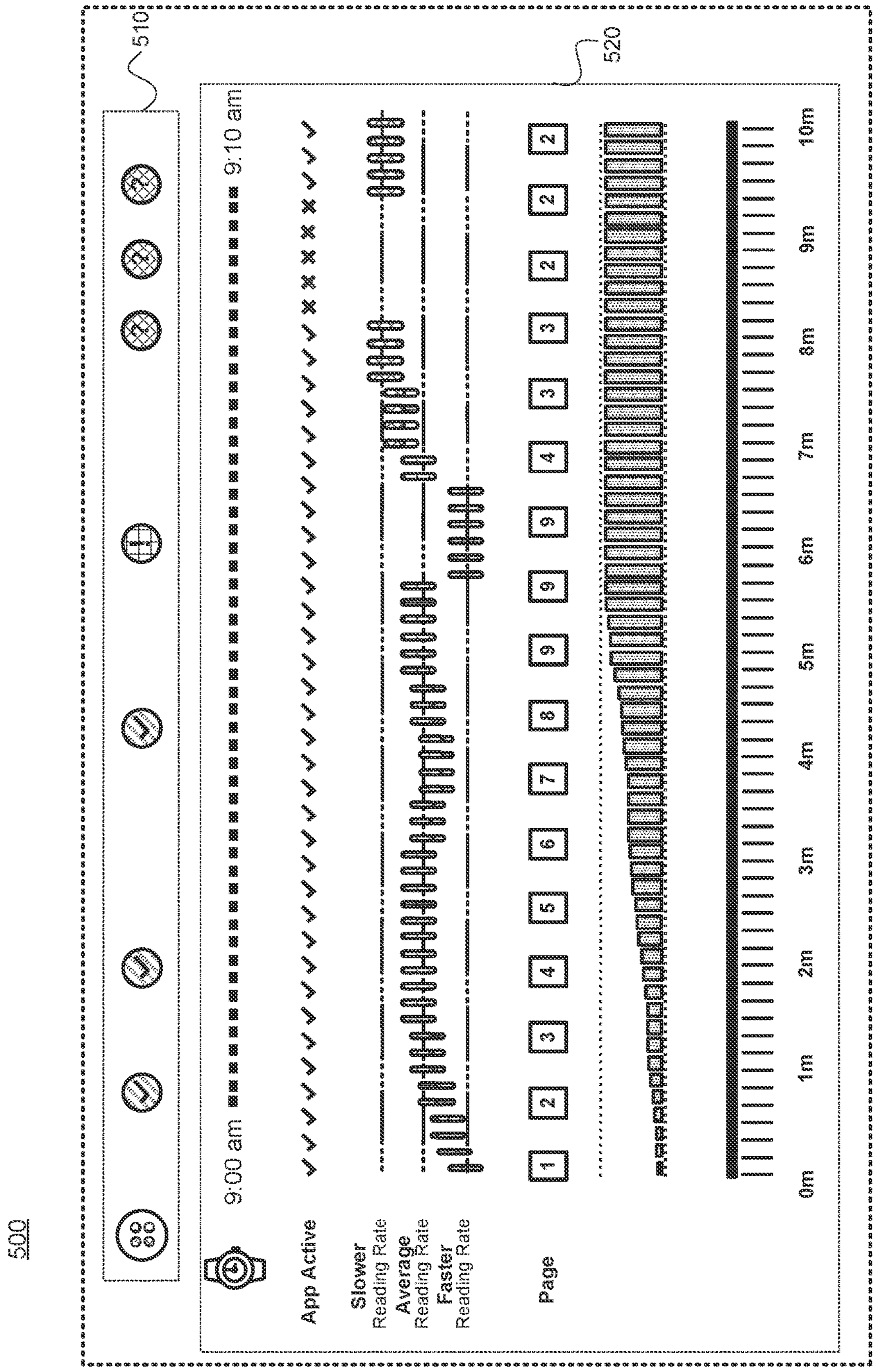
FIG. 5 illustrates another example user interface, in accordance with an embodiment.

FIG. 5 illustrates an example user interface 500, in accordance with an embodiment. The user interface 500 is a graphical user interface that may be provided by the interface 240 of the content server 110. The user interface 500 is displayed by the interface 134 of a client device 130. In some embodiments, the client device 130 may be a student device 130A, i.e., operated by a student user. In some embodiments, the client device 130 may be a teacher device, 130B, i.e., operated by a teaching user. In some embodiments, the user interface 400 may be displayed by a webpage browser, a mobile application, etc.

As shown in FIG. 5, the user interface 500 illustrates the educational content consumption behaviors of a user. The user interface 500 may include a first interface element 510 and a second interface element 520. The first interface element 510 may be associated with the user's interaction with the user interface 400 discussed in FIGS. 4A-4C. For example, the interface element 510 may includes the tags that are placed by the user to the corresponding portion of educational content. In some embodiments, the interactive element 510 may represent the user's interaction (e.g., tags) in an order that is associated with the time and/or sequence of the user's interaction/action. The interface element 520 may include a temporal graph illustrating the user's educational content consumption behaviors in time. For example, the illustrated educational content consumption behaviors may include "app active," "reading rate," "page", etc. The interface element 520 may present the user's educational content consumption behaviors in a selected period of time, e.g., form 9:00 am to 9:10 am. In some embodiments, the educational content consumption behaviors may be recorded/presented in every minute. In some embodiment, the layout (e.g., bar graph) and displayed parameters (e.g., time period, time interval, etc.) may be determined and/or customized by a user. In some embodiments, the user interface 500 may be associated with a portion of educational content and/or a specific user. In some other embodiments, the user interface 500 may be associated with the whole educational content (e.g., a whole class session), and/or collective consumption behaviors of a set of users (e.g., a whole class of student).

In some embodiments, the user interface 500 may be presented to the user in real time as the user consume the content. In some embodiments, the user interface 500 may be continuously updated. In some embodiments, the user interface 500 may be presented periodically, i.e., after a certain amount of time. In one implementation, the user interface 500 is presented after the user finishes the consumption of the whole target educational content, e.g., at the end of the lecture, at the end of a chapter, etc.

Figure 6A:
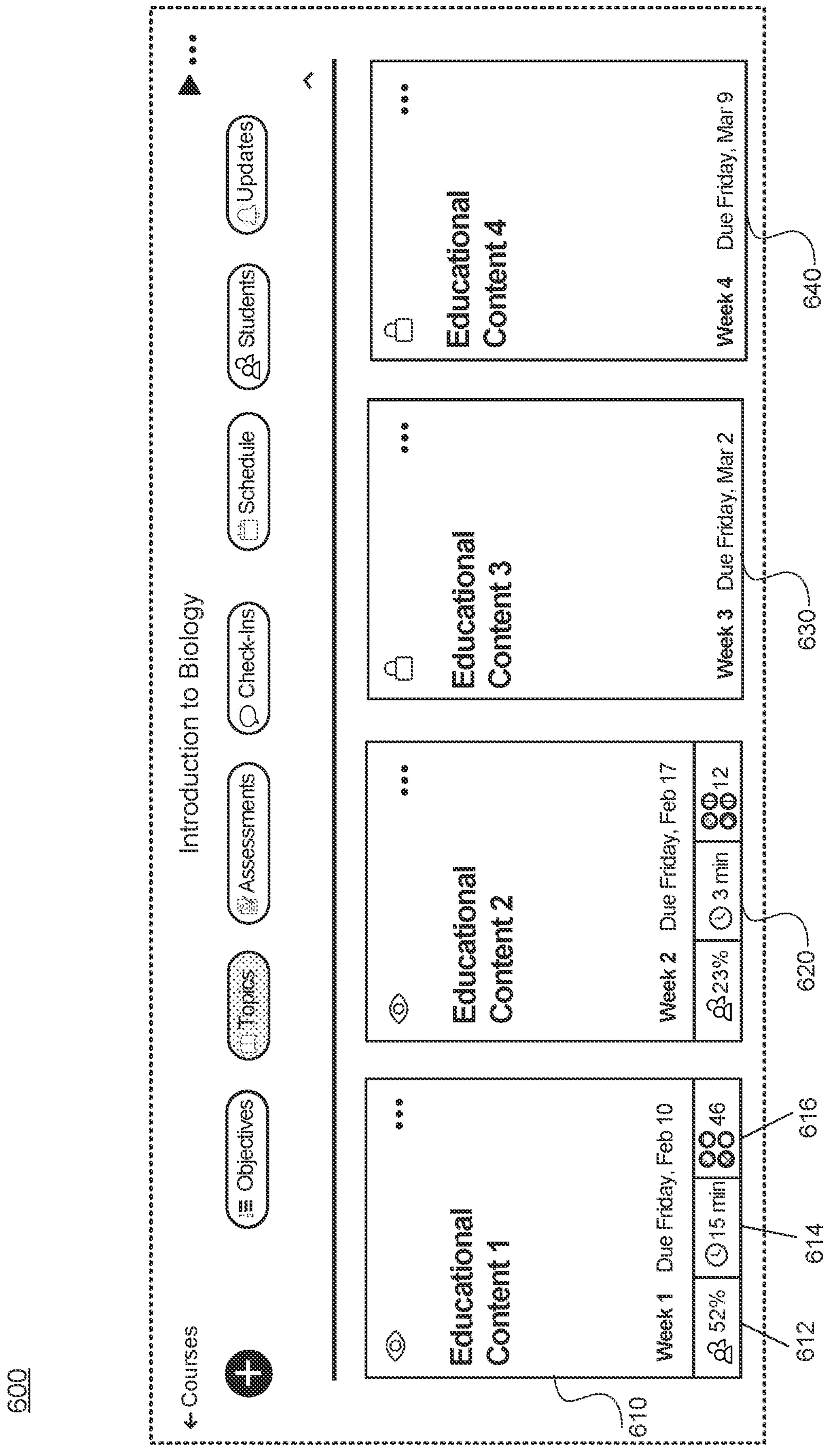
FIG. 6A illustrates another example user interface, in accordance with an embodiment.

FIG. 6A illustrates an example user interface 600, in accordance with an embodiment. The user interface 600 is a graphical user interface that may be provided by the interface 240 of the content server 110. The user interface 400 is displayed by the interface 134 of a client device 130. In some embodiments, the client device 130 may be a teacher device 130B, i.e., operated by a teaching user. In some embodiments, the user interface 600 may be displayed by a webpage browser, a mobile application, etc.

As shown in FIG. 6A, the user interface 600 presents learning analytics associated with the educational content. The learning analytics may be associated the educational content consumption behaviors of a set of users. As shown in FIG. 6A, the educational content may include a plurality of portions, and the user interface 600 includes an interface element corresponding to each portion of the educational content, e.g., 610, 620, 630, and 640. Each interface element may further include a plurality of interactive elements to present the learning analytics associated with the portion of educational content. For example, the interface element 610 includes the interactive elements 612, 614, and 616, which allow the user to interact with the interface element 610.

Figure 6B:
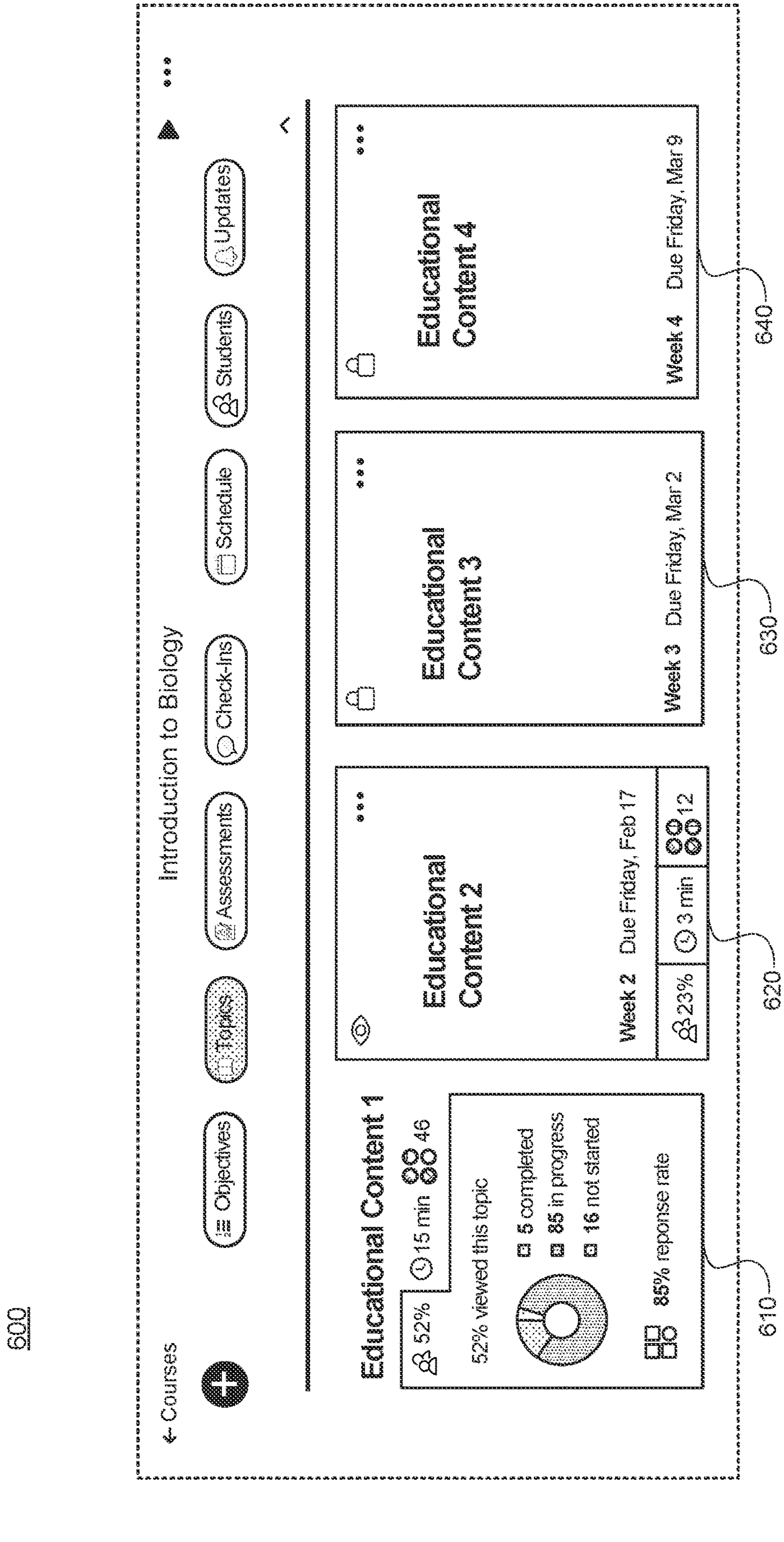
FIG. 6B illustrates another example user interface, in accordance with an embodiment.

Referring to FIG. 6B, which illustrates an example user interface 600, in accordance with an embodiment. Following the context of the example described in FIG. 6A, FIG. 6B shows the user interface 600 changes to provide one set of learning analytics after the user interacts with interactive element 612. As shown in FIG. 6B, the interface element 610 presents a statistic data of the educational content consumption behavior associated with a portion of the educational content. For example, the interface element 610 presents the percentage of users who viewed the portion of educational content and the presentation of users who input a response. In some embodiments, the interface element 610 may present the data learning analytics in graph. For example, the interface element 610 illustrates the users' progress for consumption of the portion of educational content in a pie chart.

Figure 6C:
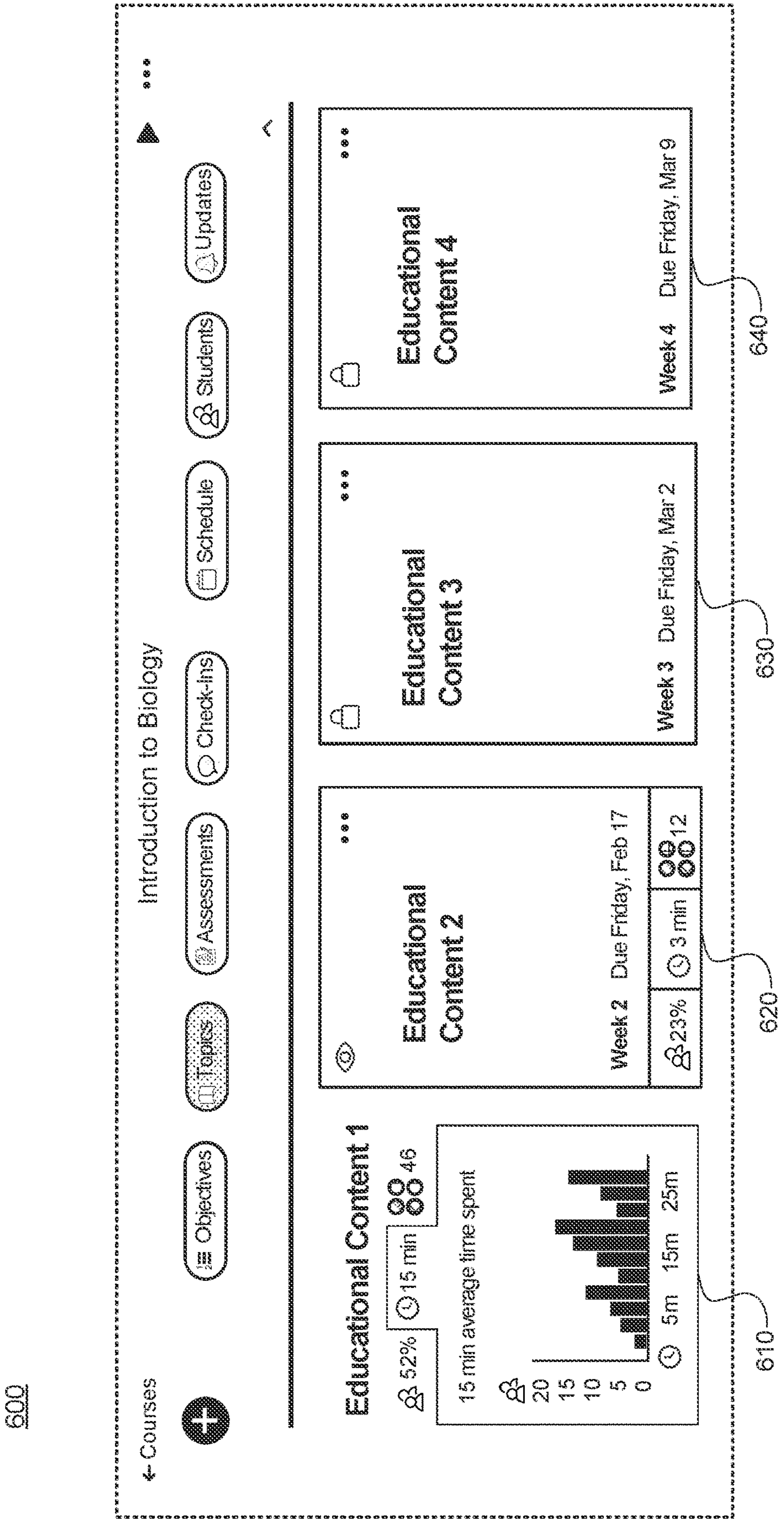
FIG. 6C illustrates another example user interface, in accordance with an embodiment.

FIG. 6C illustrates an example user interface 600, in accordance with an embodiment. Following the context of the example described in FIGS. 6A and 6B, the user interface 600 changes to provide another set of learning analytics after the user interacts with interactive element 614. As shown in FIG. 6C, the interface element 610 presents a statistic data of the educational content consumption behavior associated with a portion of the educational content. For example, the interface element 610 presents the time spent by the users on the consumption of the portion of educational content in a bar graph.

Figure 6D:
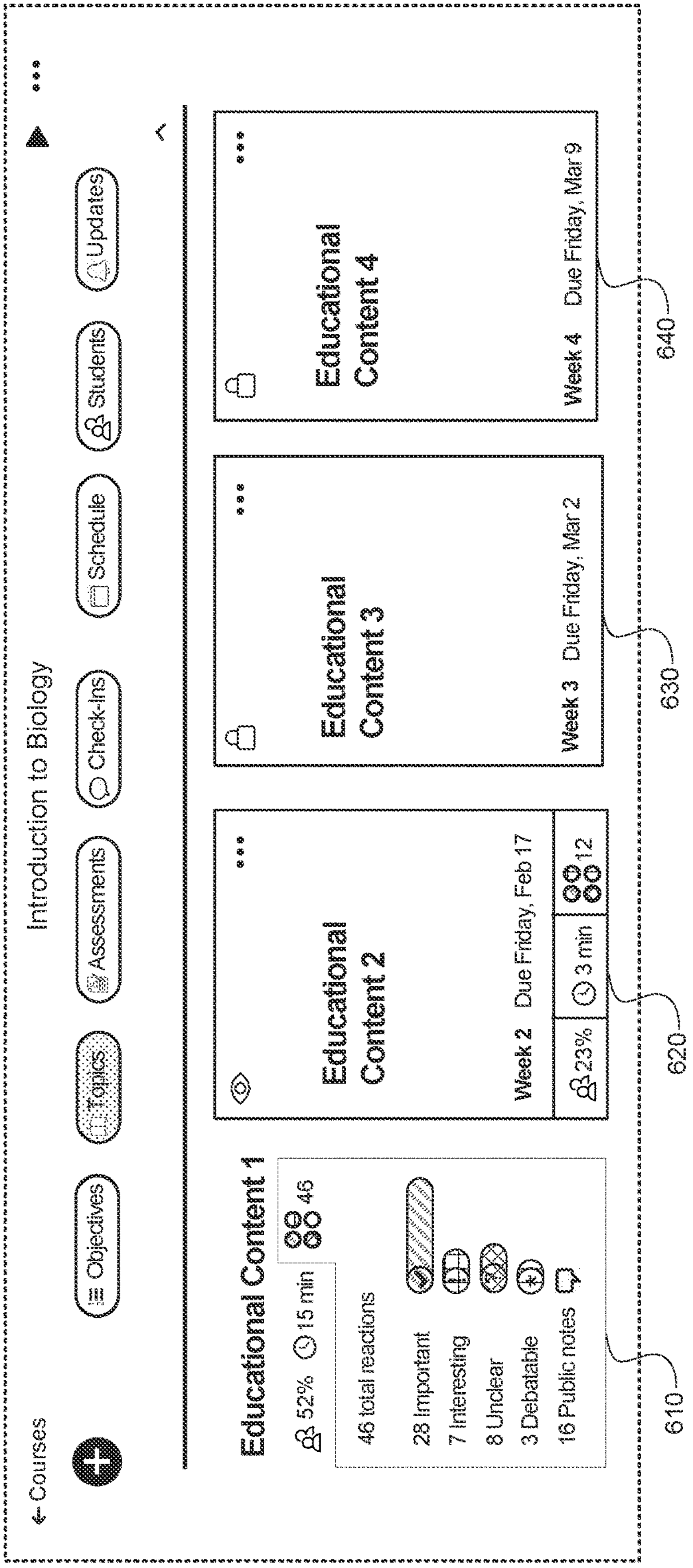
FIG. 6D illustrates another example user interface, in accordance with an embodiment.

FIG. 6D illustrates an example user interface 600, in accordance with an embodiment. Following the context of the example described in FIGS. 6A-6C, the user interface 600 changes to provide another set of learning analytics after the user interacts with interactive element 616. In some embodiments, the interface element 610 presents a summary on one or more educational content consumption behaviors associated with a portion of the educational content. For example, the interface elements 610 presents the users' interaction, such as, tag, comments, etc. in the user interface 600 for a teaching user to review.

Figure 7:
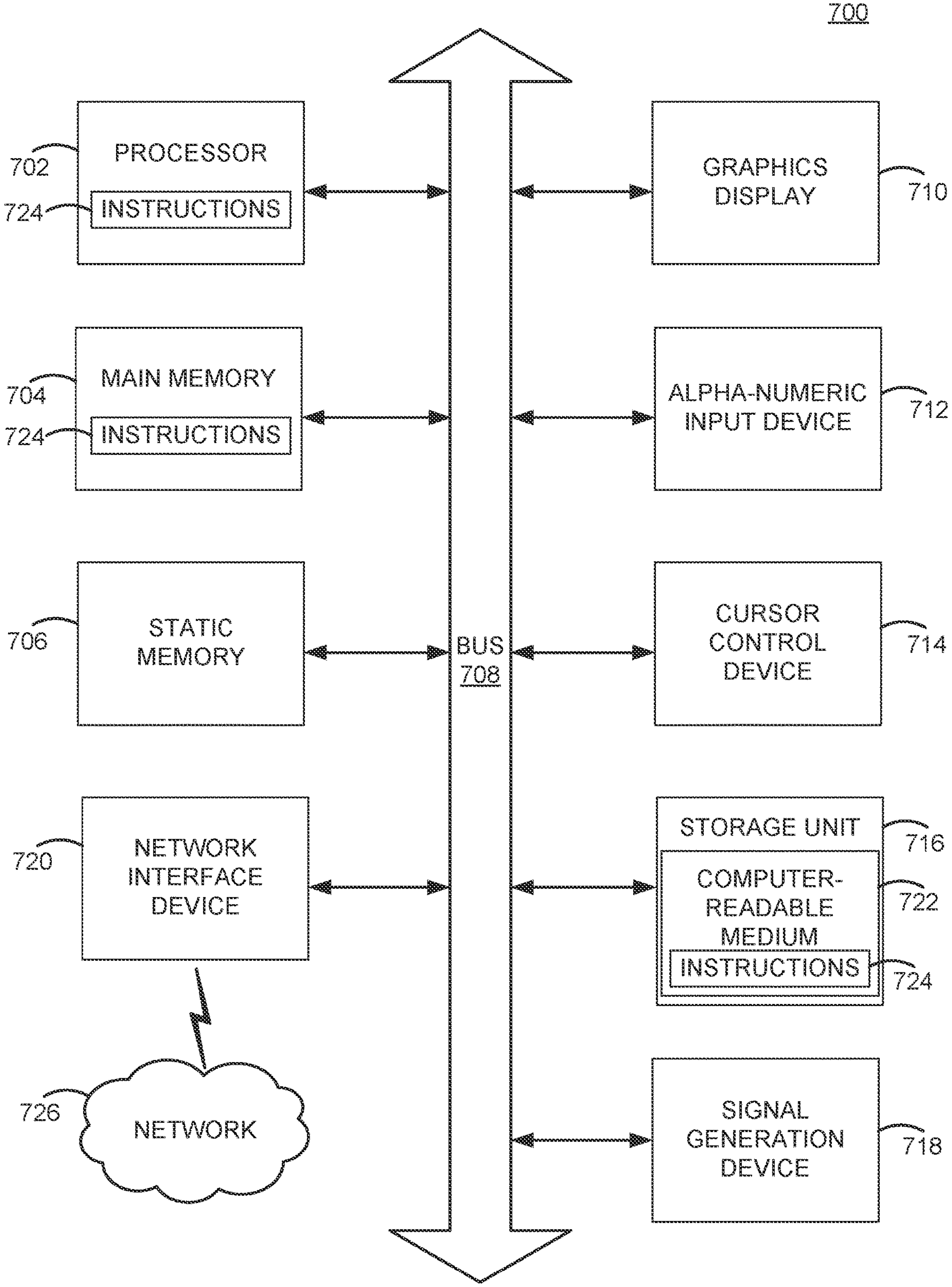
FIG. 7 is a block diagram illustrating components of an example machine able to read instructions from a machine-readable medium and execute them in one or more processors (or controllers), in accordance with an example embodiment.

FIG. 7 illustrates an example machine to read and execute computer readable instructions, in accordance with an embodiment. Specifically, FIG. 7 shows a diagrammatic representation of the data processing service 102 (and/or data processing system) in the example form of a computer system 700. The computer system 700 can be used to execute instructions 724 (e.g., program code or software) for causing the machine to perform any one or more of the methodologies (or processes) described herein. The instructions may correspond structuring a processing configuration as described herein to execute the specific functionality as described with FIGS. 1 through 6. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processing units (generally processor 702). The processor 702 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The processor executes an operating system for the computing system 700. The computer system 700 also includes a main memory 704. The computer system may include a storage unit 716. The processor 702, memory 704, and the storage unit 716 communicate via a bus 708.

In addition, the computer system 700 can include a static memory 706, a graphics display 710 (e.g., to drive a plasma display panel (PDP), a liquid crystal display (LCD), or a projector). The computer system 700 may also include alphanumeric input device 712 (e.g., a keyboard), a cursor control device 714 (e.g., a mouse, a trackball, a joystick, a motion sensor, or other pointing instrument), a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. For example, the instructions 724 may include instructions for implementing the functionalities of the transaction module 330 and/or the file management module 335. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726, such as the network 160, via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store the instructions 724. The term "machine-readable medium" shall also be taken to include any medium that is capable of storing instructions 724 for execution by the machine and that cause the machine to perform any one or more of the methodologies disclosed herein. The term "machine-readable medium" includes, but not be limited to, data repositories in the form of solid-state memories, optical media, and magnetic media.

ADDITIONAL CONSIDERATIONS

The disclosed configurations beneficially provide a system (and/or a method) for providing content recommendations. In some embodiments, the system applies a machine-learned comprehension model to behaviors of a user to determine a target measure of comprehension for each of a plurality of portions of target educational content. The system applies a content identification model to identify supplemental educational content and generates an educational content interface to present the supplemental educational content to the user. In some embodiments, the system applies the machine-learned comprehension model to behaviors of a set of users to determine a collective measure of comprehension for each of a plurality of portions of educational content. The system applies a content identification model to identify a set of supplemental educational content and generates a teacher interface to present the set of supplemental educational content. In this way, the system provides users with an interactive and enriched learning experience.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Embodiments according to the invention are in particular disclosed in the attached claims directed to a method and a computer program product, wherein any feature mentioned in one claim category, e.g., method, can be claimed in another claim category, e.g., computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the disclosed embodiments but also any other combination of features from different embodiments. Various features mentioned in the different embodiments can be combined with explicit mentioning of such combination or arrangement in an example embodiment. Furthermore, any of the embodiments and features described or depicted herein can be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A computer-implemented method comprising:

accessing, by a content server, historical consumption information and historical comprehension information, wherein the historical consumption information describes historical educational content consumption behaviors of a set of historical users, wherein the historical comprehension information comprises a historical measure of comprehension of historical educational content by the set of historical users;

generating, by the content server, a training dataset based on the historical consumption information and the historical comprehension information;

training, by the content server, a machine-learned model configured to predict a collective measure of comprehension for a set of users based on behaviors of the set of users as the set of users consume educational content;

obtaining, by the content server, interaction data of a target user consuming target educational content according to interactions with interactive elements, wherein the interactive elements are displayed on an educational content interface;

applying, by the content server, the machine-learned model to behaviors of a set of target users consuming target educational content to determine a collective target measure of comprehension for each of a plurality of portions of the target educational content, wherein applying the machine-learned model to the interaction data of the target user comprises:

classifying, by the machine-learned model, a first classification of a first interaction of the interactions with the interactive elements for a first time duration;

classifying, by the machine-learned model, a second classification of a second interaction of the interactions with the interactive elements for a second time duration;

computing a temporal graph for the first interaction of the first time duration and the second interaction of the second time duration, wherein the temporal graph illustrates behaviors of the target user according to the first classification and the second classification; and presenting the temporal graph in a teacher interface; and for a portion of the target educational content corresponding to a below-threshold collective target measure of comprehension:

identifying, by the content server, one or more characteristics of the portion of the target educational content;

applying, by the content server, a content identification model to the one or more characteristics of the portion of the target educational content to identify a set of supplemental educational content related to the portion of the target educational content; and generating, by the content server, the teacher interface to present the set of supplemental educational content on a display with the target educational content.

2. The method of claim 1, wherein generating a teacher interface to present the set of supplemental educational content comprises:

receiving, by the content server, a selection of one or more portions of the set of supplemental educational content via the teacher interface;

generating, by the content server, a student interface to present the one or more portions of the set of supplemental educational content to the set of target users.

3. The method of claim 2, wherein receiving a selection of one or more portions of the set of supplemental educational content comprises:

receiving the selection of the one or more portions of the set of supplemental educational content by a teaching user inputting the selection via the teacher interface.

4. The method of claim 2, wherein generating the student interface comprises:

generating the student interface to present the one or more portions of the set of supplemental educational content to each of the set of target users.

5. The method of claim 2, wherein generating the student interface comprises:

generating the student interface to present the one or more portions of the set of supplemental educational content to one or more of the set of target users, wherein the one or more of the set of target users is associated with the below-threshold collective target measure of comprehension corresponding to the portion of the target educational content.

6. The method of claim 1, wherein the content identification model is trained with a second dataset comprising historical educational content consumed by historical users, and the historical educational content includes one or more target educational content and supplemental educational content associated with each target educational content consumed by the historical users.

7. The method of claim 6, further comprising:

accessing the second dataset; and training the content identification model to predict a likelihood of supplemental educational content that improves collective target measure of comprehension for the portion of the target educational content.

8. A computer system comprising:

one or more computer processors; and one or more computer-readable mediums storing instructions that, when executed by the one or more computer processors, cause the computer system to:

access historical consumption information and historical comprehension information, wherein the historical consumption information describes historical educational content consumption behaviors of a set of historical users, wherein the historical comprehension information comprises a historical measure of comprehension of historical educational content by the set of historical users;

generate a training dataset based on the historical consumption information and historical comprehension information;

train a machine-learned model configured to predict a collective measure of comprehension for a set of users based on behaviors of the set of users as the set of users consume educational content;

obtain interaction data of a target user consuming target educational content according to interactions with interactive elements, wherein the interactive elements are displayed on an educational content interface;

apply the machine-learned model to behaviors of a set of target users consuming target educational content to determine a collective target measure of comprehension for each of a plurality of portions of the target educational content, wherein applying the machine-learned model to the interaction data of the target user comprises:

classifying a first classification of a first interaction of the interactions with the interactive elements for a first time duration;

classifying a second classification of a second interaction of the interactions with the interactive elements for a second time duration;

computing a temporal graph for the first interaction of the first time duration and the second interaction of the second time duration, wherein the temporal graph illustrates behaviors of the target user according to the first classification and the second classification; and presenting the temporal graph in a teacher interface; and for a portion of the target educational content corresponding to a below-threshold collective target measure of comprehension:

identify one or more characteristics of the portion of the target educational content;

apply a content identification model to the one or more characteristics of the portion of the target educational content to identify a set of supplemental educational content related to the portion of the target educational content; and generate the teacher interface to present the set of supplemental educational content on a display with the target educational content.

9. The system of claim 8, wherein the instructions to generate a teacher interface to present the set of supplemental educational content comprise:

receiving a selection of one or more portions of the set of supplemental educational content via the teacher interface;

generating a student interface to present the one or more portions of the set of supplemental educational content to the set of target users.

10. The system of claim 9, wherein the instructions to receive a selection of one or more portions of the set of supplemental educational content comprise:

receiving the selection of the one or more portions of the set of supplemental educational content by a teaching user inputting the selection via the teacher interface.

11. The system of claim 9, wherein the instructions to generate the student interface comprise:

generating the student interface to present the one or more portions of the set of supplemental educational content to each of the set of target users.

12. The system of claim 9, wherein the instructions to generate the student interface comprise:

generating the student interface to present the one or more portions of the set of supplemental educational content to one or more of the set of target users, wherein the one or more of the set of target users is associated with the below-threshold collective target measure of comprehension corresponding to the portion of the target educational content.

13. The system of claim 8, wherein the content identification model is trained with a second dataset comprising historical educational content consumed by historical users, and the historical educational content includes one or more target educational content and supplemental educational content associated with each target educational content consumed by the historical users.

14. The system of claim 13, wherein the instructions, when executed by the one or more computer processors, cause the computer system to:

access the second dataset;

train the content identification model to predict a likelihood of supplemental educational content that improves collective target measure of comprehension for the portion of the target educational content; and modify the educational content interface to add second supplemental educational content for display.

15. A non-transitory computer-readable medium comprising stored instructions that when executed by one or more processors of one or more computing devices, cause the one or more computing devices to:

access historical consumption information and historical comprehension information, wherein the historical consumption information describes historical educational content consumption behaviors of a set of historical users, wherein the historical comprehension information comprises a historical measure of comprehension of historical educational content by the set of historical users;

generate a training dataset based on the historical consumption information and historical comprehension information;

train a machine-learned model configured to predict a collective measure of comprehension for a set of users based on behaviors of the set of users as the set of users consume educational content;

obtain interaction data of a target user consuming target educational content according to interactions with interactive elements, wherein the interactive elements are displayed on an educational content interface;

apply the machine-learned model to behaviors of a set of target users consuming target educational content to determine a collective target measure of comprehension for each of a plurality of portions of the target educational content, wherein applying the machine-learned model to the interaction data of the target user comprises:

classifying, by the machine-learned model, a first classification of a first interaction of the interactions with the interactive elements for a first time duration;

classifying, by the machine-learned model, a second classification of a second interaction of the interactions with the interactive elements for a second time duration;

computing a temporal graph for the first interaction of the first time duration and the second interaction of the second time duration, wherein the temporal graph illustrates behaviors of the target user according to the first classification and the second classification; and presenting the temporal graph in a teacher interface; and for a portion of the target educational content corresponding to a below-threshold collective target measure of comprehension:

identify one or more characteristics of the portion of the target educational content;

apply a content identification model to the one or more characteristics of the portion of the target educational content to identify a set of supplemental educational content related to the portion of the target educational content; and generate the teacher interface to present the set of supplemental educational content on a display with the target educational content.

16. The non-transitory computer-readable medium of claim 15, wherein the instructions to generate a teacher interface to present the set of supplemental educational content comprise:

receiving a selection of one or more portions of the set of supplemental educational content via the teacher interface;

generating a student interface to present the one or more portions of the set of supplemental educational content to the set of target users.

17. The non-transitory computer-readable medium of claim 16, wherein the instructions to receive a selection of one or more portions of the set of supplemental educational content comprise:

receiving the selection of the one or more portions of the set of supplemental educational content by a teaching user inputting the selection via the teacher interface.

18. The non-transitory computer-readable medium of claim 16, wherein the instructions to generate the student interface comprise:

generating the student interface to present the one or more portions of the set of supplemental educational content to each of the set of target users.

19. The non-transitory computer-readable medium of claim 16, wherein the instructions to generate the student interface comprise:

generating the student interface to present the one or more portions of the set of supplemental educational content to one or more of the set of target users, wherein the one or more of the set of target users is associated with the below-threshold collective target measure of comprehension corresponding to the portion of the target educational content.

20. The non-transitory computer-readable medium of claim 15, wherein the content identification model is trained with a second dataset comprising historical educational content consumed by historical users, and the historical educational content includes one or more target educational content and supplemental educational content associated with each target educational content consumed by the historical users.

* * * * *